L. M. Knowles,
Water Elevator.
No. 89,413. Patented Apr. 27, 1869.
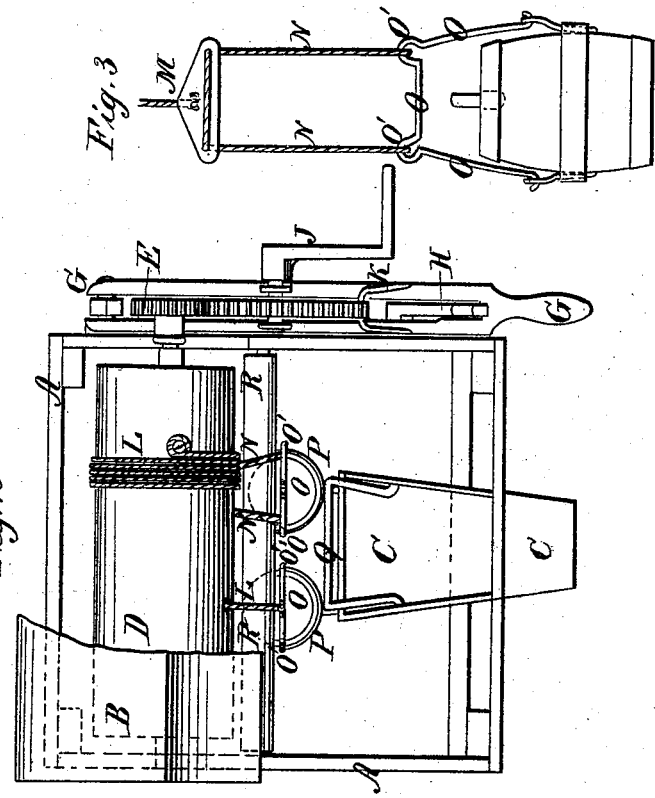
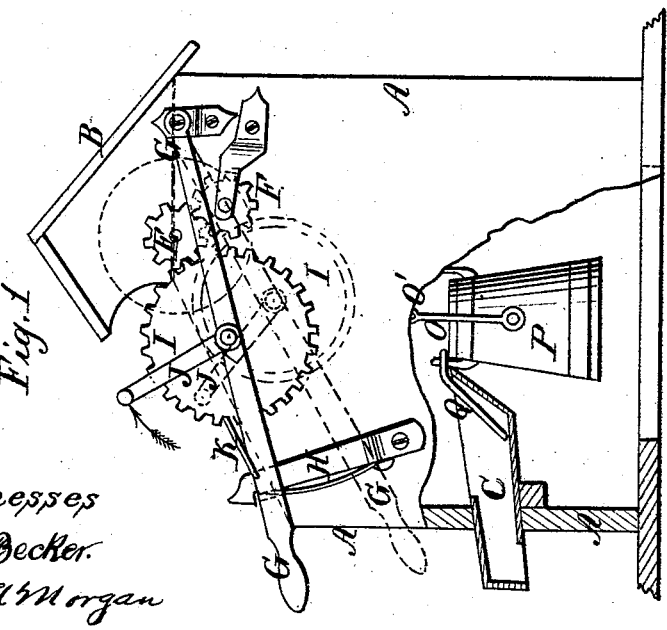
Witnesses
Jno. Becker.
Wm A Morgan
Inventor
L. M. Knowles.
Munn & Co
Attorneys

L. M. KNOWLES, OF OWATONNA, MINNESOTA.

Letters Patent No. 89,413, dated April 27, 1869.

IMPROVEMENT IN WATER-ELEVATORS.

The Schedule referred to in these Letters Patent and making part of the same.

*To all whom it may concern:*

Be it known that I, L. M. KKOWLES, of Owatonna, in the county of Steele, and State of Minnesota, have invented a new and useful Improvement in Windlasses; and I do hereby declare that the following is a full, clear, and exact description thereof, which will enable others skilled in the art to make and use the same, reference being had to the accompanying drawing, forming part of this specification, in which—

Figure 1 is a side view of a well-curb, to which my improvement has been attached, part being broken away, to show the construction.

Figure 2 is a top view of the same, part being broken away, to show the construction.

Figure 3 is a detail view, illustrating the manner in which the hoisting-ropes are connected with the buckets.

Similar letters of reference indicate corresponding parts.

My invention has for its object to improve the construction of windlasses for raising water, and for raising and lowering light weights, so as to make them more convenient and reliable in use; and It consists in the construction and combination of various parts of the apparatus, as hereinafter more fully described.

A represents a well-curb, about the construction of which there is nothing new, and which may be provided with a cover, B, in whole or in part, and with a spout C, to receive the water from the buckets and conduct it to the pail or other receiver.

D is a drum, or cylinder, the journals of which revolve in bearings in the sides of the curb A, or in other suitable supports.

To the projecting end of one of the journals of the cylinder D is rigidly attached a small gear-wheel, E, so that the said gear-wheel E may carry the said cylinder D with it in its revolution.

F is a small gear-wheel, similar in form and size to the gear-wheel E, and which revolves upon an axle attached to the curb A, below the wheel E, in such a position that the teeth of the wheel F may mesh into the teeth of the said wheel E, as shown in fig. 1.

G is a lever which is slotted longitudinally, and the rear end of which is pivoted to the upper part of the curb A, in the rear of the gear-wheels E F, and the forward end of which is connected with the guide, and catch-arm H, which passes through the forward part of the slots in the said lever G, is attached to the curb A, and is provided with a spring catch, so arranged as to hold the said lever securely, both when raised and when lowered.

I is a large gear-wheel, which is placed in the slot of the lever G, and is pivoted to said lever in such a position that when the lever G is lowered the teeth of the gear-wheel I may mesh into the teeth of the gear-wheel F, as shown in red in fig. 1, and when the lever G is raised the teeth of the gear-wheel I may mesh into the teeth of the gear-wheel E, as shown in black in fig. 1.

To the outwardly-projecting end of the journal of the gear-wheel I is attached the crank J, by which the apparatus is operated, and the length of the arm of which should be greater than the distance from the centre of the wheel I to the centre of the wheel E, so as to regain any leverage that may be lost by the interposition of the gearing.

By this construction, by raising the forward end of the lever G, the wheel I is made to gear into the wheel E, so that the cylinder D may be made to revolve in one direction, and, by lowering the forward end of the said lever G, the wheel I is made to gear into the wheel F, so that, by turning the crank J in the same direction as before, the cylinder D may be revolved in the other direction.

K is a pawl, pivoted to the forward part of the lever G, in such a position as to rest by its own weight upon the teeth of the wheel I, in such a position as not to impede the forward movement of said wheel, while entirely preventing its backward movement.

L are two ropes, the upper ends of which are attached to the cylinder D, and which are wound around said cylinder in opposite directions, so that, as the cylinder is being revolved in either direction, one of said ropes will be unwinding while the other will be winding up.

To the lower ends of each of the ropes L is attached the middle part of a short cross-bar M, through the ends of which are formed holes for the passage or attachment of the ropes, or chains N, the lower ends of which are attached to loops, or ears O', formed upon the bail O, upon each side of, and at equal distances from the middle point of said bail, as shown in fig. 3.

The ends of the bail O are pivoted to the opposite sides of the buckets P, a little above the centres of said buckets, by means of ears, in the ordinary manner.

The bottoms of the buckets P should be weighted or provided with valves, to insure their being readily filled when lowered into the water.

Q is a bail, pivoted to the spout C, in such a position that it may project beyond the inner end of the said spout, so that the small ears attached to the upper edge of the buckets P may catch upon the said bail, to tilt or incline the said buckets, and discharge the water into the spout.

R is a roller, the ends of which are pivoted to the sides of the curb A, in such positions that the said roller R may be in front of and a little below the cylinder D.

The ropes L both pass over the roller R, and the ropes, or chains N should be of such a length that the cross-bar M and ropes, or chains N may reach the said roller R before the buckets P reach the spout C, so that the said roller, acting upon the said cross-bar M and ropes, or chains N, may bring the said buckets P into proper position to catch upon the bail Q, and be tilted, to discharge the water into the spout C.

Having thus described my invention,

I claim as new, and desire to secure by Letters Patent—

1. The combination of the slotted lever G, large gear-wheel I, small gear-wheels E and F, with each other and with the cylinder D, substantially as herein shown and described, and for the purpose set forth.

2. The combination of the short cross-bars M and ropes, or chains N with the bucket-bails O, ropes L, and roller R, substantially as herein shown and described, and for the purpose set forth.

L. M. KNOWLES.

Witnesses:
E. S. WILBER,
A. S. CHASE.